United States Patent [19]
Yoneda et al.

[11] Patent Number: 5,825,442
[45] Date of Patent: *Oct. 20, 1998

[54] LIQUID CRYSTAL DISPLAY DEVICE AND METHOD FOR MAKING SAME HAVING A DIFFUSER MADE OF SPHERICAL PARTICLES IN A TRANSPARENT BODY

[75] Inventors: Kotaro Yoneda, Kanagawa; Yasunori Sato, Kagoshima; Hisao Hayashi, Kanagawa, all of Japan

[73] Assignee: Sony Corporation, Japan

[*] Notice: This patent issued on a continued prosecution application filed under 37 CFR 1.53(d), and is subject to the twenty year patent term provisions of 35 U.S.C. 154(a)(2).

[21] Appl. No.: 623,391

[22] Filed: Mar. 27, 1996

[30] Foreign Application Priority Data

Mar. 31, 1995 [JP] Japan .................................. 7-074977

[51] Int. Cl.⁶ .................................................. G02F 1/1335
[52] U.S. Cl. ......................................... 349/95; 349/112
[58] Field of Search ................................. 359/40, 41, 48, 359/49, 69, 707; 349/64, 95, 112

[56] References Cited

U.S. PATENT DOCUMENTS

| | | | |
|---|---|---|---|
| 4,604,297 | 8/1986 | Liu | 427/165 |
| 5,161,041 | 11/1992 | Abileah et al. | 359/40 |
| 5,299,289 | 3/1994 | Omae et al. | 349/95 |

FOREIGN PATENT DOCUMENTS

| | | | |
|---|---|---|---|
| 86-284731 | 12/1986 | Japan . | |
| 4-081816 | 3/1992 | Japan | 359/69 |

Primary Examiner—William L. Sikes
Assistant Examiner—Walter Malinowski
Attorney, Agent, or Firm—Ronald P. Kananen

[57] ABSTRACT

A liquid crystal display device of the present invention includes a first transparent electrode layer and a second transparent electrode layer sandwiching a liquid crystal layer between, a light source for radiating the substantially collimated light to the liquid crystal layer, and a diffusion unit for diffusing the light which has just been transmitted through the liquid crystal layer. The diffusion unit is arranged on the first glass plate via a transparent polymer for forming the first transparent electrode layer and a first alignment layer. Then, on the second glass plate, the second transparent electrode layer and a second orientation film are formed. A liquid crystal is introduced into a space between the first orientation film and the second alignment layer film and the light source is arranged for completing the liquid crystal display device.

18 Claims, 2 Drawing Sheets

LIQUID CRYSTAL DISPLAY DEVICE AND METHOD FOR MAKING SAME HAVING A DIFFUSER MADE OF SPHERICAL PARTICLES IN A TRANSPARENT BODY

BACKGROUND OF THE INVENTION

This invention relates to a liquid crystal display device having a liquid crystal layer sandwiched between two transparent electrode layers, and a method for making a liquid crystal display device.

Description of the Related Art

A liquid crystal display device is employed as a device for displaying a letter or a figure in a variety of fields such as computers, OA equipment and table calculators. The liquid crystal device, while having such merits as a low driving voltage, low power consumption and a flat plate shape, sometimes has a slow response speed, a limited operating temperature range, and a narrow viewing angle. Of these shortcomings, the narrow viewing angle is thought to be combatted by constructions which employ a phase difference plate, a split orientation and capacitance charging to driving elements, and an optical lens.

A liquid crystal display device employing a phase difference plate experiences a problem in that, although a viewing angle in a specified direction is enlarged, the viewing angle cannot be enlarged in any other direction. With a liquid crystal display device employing a split orientation and capacitance charging to driving elements, a partial improvement in the viewing angle is achieved only at the cost of a lowered overall contrast. With a liquid crystal display device employing an optical lens, since the light transmitted through a liquid crystal layer reaches the optical lens by way of a glass plate, for example, the light is wastefully diffused by the glass plate, thus lowering the resolution of the liquid crystal display device.

Brief Summary of the Invention

It is therefore an object of the present invention to provide a liquid crystal display device having a high contrast and a wide viewing angle, and a method for producing the liquid crystal device.

It is another overall object of the invention to provide a liquid crystal display device which improves the shortcomings discussed above.

The invention for accomplishing the above and other objects, resides in a liquid crystal display device having a first substrate with a first transparent electrode layer formed on an inner surface of the first substrate; a second substrate having a second transparent electrode layer formed on an inner surface of the second substrate; an a liquid crystal layer sandwiched between the first and second substrates. A light source provides, preferably by irradiation, a substantially collimated light to the liquid crystal layer from one of the transparent electrode layers, such as the second transparent electrode layer. Diffusion means, such as a plurality of spherical lenses uniformly arranged along the first transparent layer, are located between the first substrate and the first transparent electrode layer and are arranged to diffuse the light transmitted through the liquid crystal layer. Preferably, the diffusion means is arranged on a side opposition to the other of the transparent electrode layers with respect to the liquid crystal layer for diffusing the light which has been transmitted through the liquid crystal layer.

Preferably, the light source collimates the light to within a range of ±15°, such as by a prism. The diffusion means preferably diffuses the transmitted light in a range of about ±40°. The device may also comprise a color filter disposed between the diffusion means and the first transparent electrode layer. In addition, the second substrate may comprise an active matrix array substrate.

A second aspect of the invention resides in a method for making a liquid crystal display device of the type described. The method includes the steps of arranging a diffusion means by way of a transparent polymer layer on a first transparent substrate; forming a first transparent electrode layer on the diffusion means, and forming a first alignment layer thereon; forming a second transparent electrode layer on a second transparent substrate and forming a second alignment layer on the second transparent electrode layer; combining the first and second transparent substrates so as to oppose the first and second alignment layers; forming a liquid crystal between the first and second alignment layers; and providing a light source for irradiating a substantially collimated light toward the liquid crystal layer by way of the second transparent substrate.

As in the apparatus aspect of the invention, the diffusion means preferably comprises a plurality of spherical lenses uniformly arranged along the first transparent electrode layer. The first transparent substrate may also have a color filter layer between the transparent polymer layer and the first transparent electrode layer, while the second transparent electrode layer may comprise of plurality of picture element electrodes arranged in a matrix.

These and other features of the invention will be seen from a detailed review of the written description of the invention which follows, taken in conjunction with the accompanying drawings.

DETAILED DESCRIPTION OF THE PREFERRED EMBODIMENTS

With the liquid crystal display device according to the present invention, light irradiated from a light source is directed in a substantially collimated state to the liquid crystal layer. The presence or the absence of light transmitted through the liquid crystal layer is determined based upon the voltage application across two transparent electrodes. The light which has been transmitted through the liquid crystal layer is diffused with a pre-set diffusion by diffusion means, preferably comprising a plurality of spherical lenses. That is, the light which has been transmitted through the liquid crystal layer is a collimated light and reaches the diffusion means without interruption so that diffusion occurs in accordance with the characteristics of the diffusion means.

With the method for producing the liquid crystal display device according to the present invention, the diffusion means are provided on the first transparent substrate by way of a transparent polymer. Thus the diffusion means is fixedly located by being embedded in the transparent polymer. On the diffusion means is formed a first transparent electrode layer, and a first alignment or orientation layer is formed thereon. A second transparent substrate, on which the second transparent electrode layer and the second alignment or orientation layer have been formed, is connected to the first transparent substrate by way of a sealant. The liquid crystal is located in or injected into a space between the first and second alignment layers facing each other and the light source is provided for completing the liquid crystal display device in which the light, which has been transmitted through the liquid crystal layer, can be diffused by the diffusion means.

Figure 1:
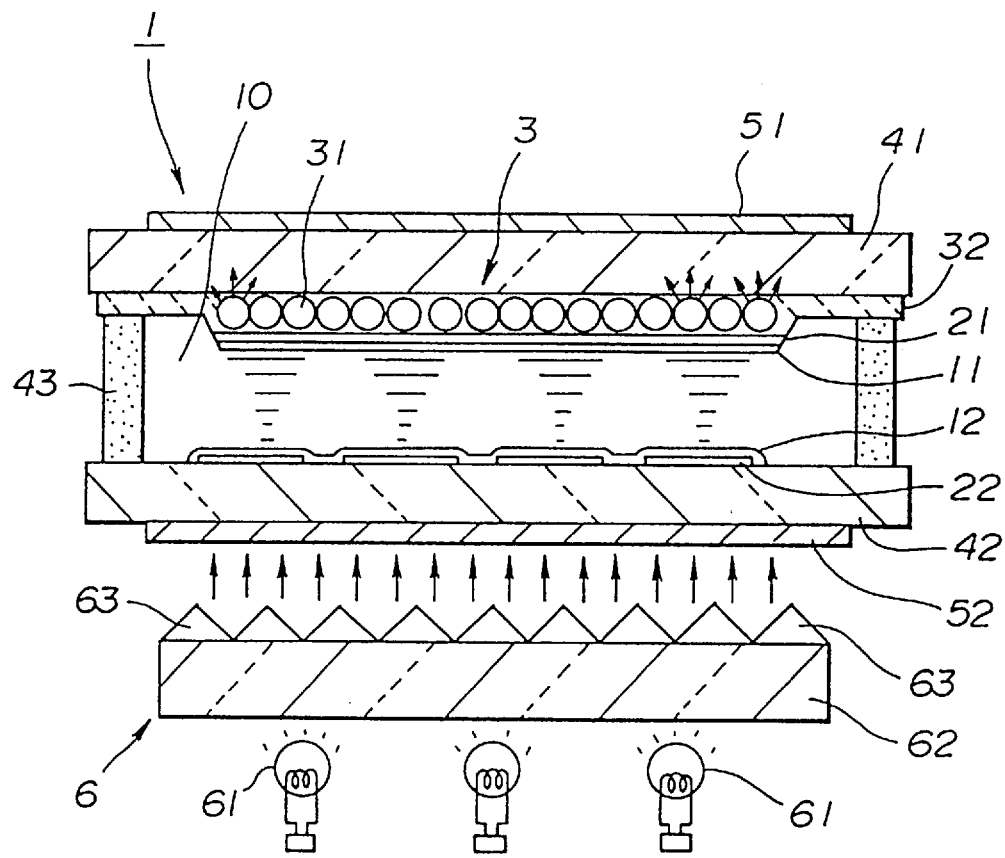
FIG. 1 is a schematic cross-sectional view for illustrating an arrangement of a liquid crystal display device according to the present invention.

Referring to the drawings, a liquid crystal device according to the present invention and a method for producing the device will be explained in detail. FIG. 1 is a schematic cross-sectional view for explaining the construction of a liquid crystal display device 1 according to the present invention. For ease in understanding the invention, FIG. 1 shows an example of a simple white/black matrix type liquid crystal device 1.

The liquid crystal display device 1 is comprised of a first transparent electrode layer 21 such as Indium Tin Oxide (ITO) and a second transparent electrode layer 22 such as Indium Tin Oxide (ITO), as two transparent electrode layers arranged on both sides of a liquid crystal layer 10. A light source 6 provides, such as by irradiation, a substantially collimated light beam through the second transparent electrode layer 22 toward the liquid crystal layer 10. Diffusion means 3 are arranged on the surface of the first transparent electrode layer 21 opposite to the surface facing the liquid crystal layer 10 for diffusing the light directly after transmission thereof through the liquid crystal layer 10 and the first transparent electrode layer 21.

The liquid crystal molecules in the liquid crystal layer 10 are oriented by a first alignment or orientation layer or film 11 and a second alignment or orientation layer or film 12. An effect of double refraction is produced by applying an electrical voltage across the first transparent electrode layer 21 and the second transparent electrode layer 22.

The diffusion means 3 are preferably constituted by a plurality of spherical lenses 31 uniformly arranged along a surface of the first transparent electrode layer 21. The spherical lenses 31 are constituted by spherical particles of silica, glass or plastics, and are attached by way of a transparent polymer 32 to a first glass plate 41, acting as a substrate for the first transparent electrode layer 21 formed on an inner layer thereof. The second alignment or orientation layer or film 12 and the second transparent electrode layer 22 are attached to a second glass plate 42, acting as a second substrate for the second transparent electrode layer 22 formed on an inner surface thereof. The second glass plate 42 and the first glass plate 41 are bonded to each other by way of a sealant 43 with a pre-set distance between them. A first polarization plate 51 is attached to the first glass plate 41 and a second polarization plate 52 is attached to the second glass plate 42.

The light source 6 includes a plurality of lamps 61, such as including an incandescent lamp, a discharge lamp, or electro-luminescence, a light guide plate 62, such as a glass plate, and a prism 63 for light collection. By such arrangement, the light radiated by the lamps 61 is passed through a light guide plate 62 and is collimated by a prism 63 into a substantially collimated light, to a range of within, for example, ±15°, so as to be polarized by the second polarization plate 52 to a pre-set polarized light which is incident on the liquid crystal layer 10.

With the liquid crystal display device 1 of the instant embodiment, the light transmitted through the liquid crystal layer 10 by pre-set voltage application across the first transparent electrode layer 21 and the second transparent electrode layer 22 may readily be diffused by the diffusion means 3. That is, since the light incident on the liquid crystal layer 10 is substantially collimated light, the substantially collimated light is irradiated on pixels associated with each matrix constituted by the first transparent electrode layer 21 and the second transparent electrode layer 22.

The light transmitted through respective pixels is incident on, for example, the spherical lenses 31 constituting the diffusion means 3 without being interrupted and is diffused by the diffusion means 3 depending upon the refractive index of the spherical lenses. The result is that the light associated with the respective pixels is individually diffused. In addition, since the distance between the light source 6 and the diffusion means 3 may be diminished as compared to the conventional device exploiting the lens system, the transmitted light can be diffused at a pre-set angle without lowering the resolution.

Thus, with the liquid crystal display device 1 of the instant embodiment, the angle of view conforming to the characteristics of the diffusion means 3 may be realized without lowering the contrast of the light transmitted through the liquid crystal layer 10. For example, a front contrast of 1:100 may be realized in a range of from about ±70° to 80° by employing the spherical lenses 31 having a diameter between 1 micron and tens of microns and a refractive index on the order of 1.9.

Figure 2:
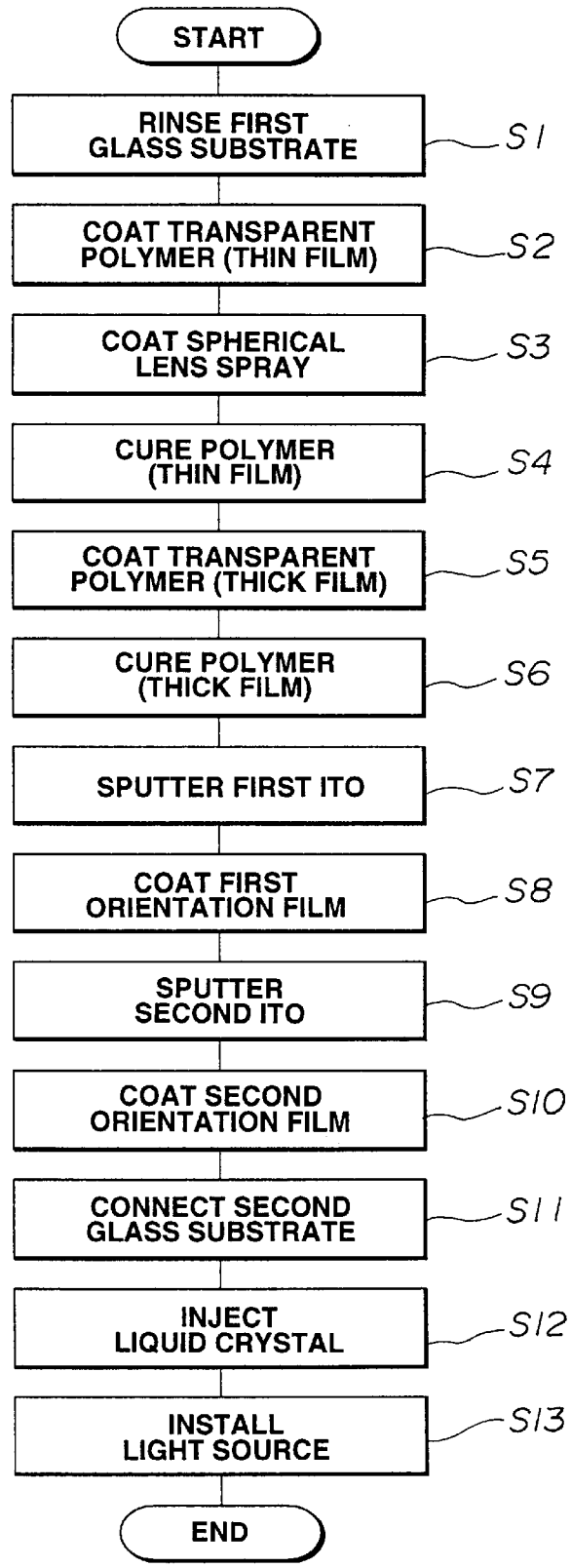
Fig.2 is a flow-chart for illustrating the method for producing the liquid crystal display device according to the present invention.

Referring to FIG. 2, the method of producing the liquid crystal device 1 according to the present invention is explained. For numerals not shown in FIG. 2, reference may be made to FIG. 1, where like reference numerals are used to identify like parts. As shown at step S1, the first glass substrate in the form of the glass plate 41 is rinsed by wet rinsing or dry rinsing and thereby freed of particles or organic matter deposited thereon.

Then, in step S2, the transparent polymer 32 is coated by spin coating on the first glass plate 41 to a thin thickness of the order of one tenth to one-fifth of the diameter of the spherical lenses 31.

Then, as seen in step S3, the spherical lenses 31 formed of silica, glass or plastics, are coated on the transparent polymer 32 and bonded to the transparent polymer 32 by exploiting the adhesive tackiness of the polymer 32.

Then, at step S4, the transparent polymer 32 is cured by heating or irradiation of UV rays for immobilizing and fixedly locating the spherical lenses 31. Then, for coating the transparent polymer thick film 32 of step S5, the transparent polymer 32 is coated for overlying the spherical lenses 31. This step is carried out for eliminating surface irregularities caused by the spherical lenses for providing a planar upper surface. The transparent polymer is coated to a thickness on the order of 1.1 to 3 times the diameter of the spherical lenses 31.

Then, at step S6, the transparent polymer thick film 32 is cured by heating or UV irradiation as before. In this state, the first transparent electrode layer 21, as a transparent electrode layer, is formed at step S7 on the transparent polymer 32 by sputtering or vacuum deposition. Then, by way of coating of the first orientation layer of step S8, the first alignment or orientation film 11 is coated on the first transparent or electrode layer 21.

Then, by way of sputtering for forming the second transparent electrode layer 22 shown at step S9, the second transparent electrode layer 22, as another transparent electrode layer, is formed on the second glass plate 42 by sputtering or vapor deposition. Then, by way of coating the second orientation layer, shown at step S10, the second alignment or orientation film 12 is coated on the second transparent or electrode layer 22.

Then, by way of connection of the second glass substrate, shown at step S11, the first glass plate 41, on which the diffusion means 3, first transparent electrode layer 21 and the first alignment or orientation layer 11 have been formed, is connected to the second glass plate 42, on which the second transparent or electrode layer 22 and the second alignment or orientation layer 12 have been formed. This connection is achieved using the sealant 43. The sealant 43 may be formed of a thermosetting resin, such as epoxy or phenolic resin, and is used for maintaining a pre-set gap for sealing the liquid crystal between the first glass plate 41 and the second glass plate 42 and for safeguarding the sealed liquid crystal against moisture or contamination.

Then, by way of forming or injection of the liquid crystal shown at step S12, the liquid crystal is injected into a space between the first glass plate 41 and the second glass plate 42 interconnected by the sealant 43. The liquid crystal is injected by the vacuum injection method into the space between the first glass plate 41 and the second glass plate 42 so that the liquid crystal layer 10, in contact with the first orientation layer 11 and the second orientation layer 12, is sandwiched between the first transparent electrode layer 21 and the second transparent electrode layer 22.

Then, by way of installing a light source shown at step S13, the light source 6, made up of the lamps 61, light guide plate 62 and the prism 63, is installed outside of the second glass plate 42. For installing the light source 6, the first polarization plate 51 is first mounted outside of the first glass plate 41, and the second polarization plate 52 is first mounted outside of the second glass plate 42. This step completes the liquid crystal device 1 of the instant embodiment.

In the above-described method for producing the liquid crystal device 1, the spherical lenses 31 are used as the diffusion means 3. Thus, it becomes possible by the lens spraying coating step S3 to arrange the spherical lenses 31 used for diffusing the light transmitted through the liquid crystal layer 10 uniformly without fluctuations. The spherical lenses 31 may be uniformly arranged not only by spraying but also by previously uniformly arranging or arraying the spherical lenses 31 on a film, not shown, and bonding the film with the aid of an adhesive.

Thus there may be produced the liquid crystal display device 1 which enables the angle of view conforming to the characteristics of the diffusion means 3 to be obtained without lowering the contrast after transmission of the light through the liquid crystal layer 10. Although the liquid crystal device 1 may be of the simple white/black matrix type shown in the instant embodiment, the present invention may be applied to a color type or an active matrix type liquid crystal display device. For providing the color type, it suffices to provide a color filter, not shown, between the transparent polymer 32 of the first glass plate 41 and the first transparent electrode layer 21. For providing an active matrix type, it suffices to provide a driving element, such as TFT or MIM, on the second glass plate 42. Although the spherical lenses 31 are employed as diffusion means 3, it is also possible to use lenses other than the spherical lenses 31.

As described above, the liquid crystal device and the method for producing the device, according to the present invention, give the following meritorious effects. That is, since the liquid crystal display device of the present invention has the diffusion means for diffusing the light directly after transmission through the liquid crystal layer, the angle of view suited to the characteristics of the diffusion means may be achieved. On the other hand, with the method for producing the liquid crystal display device of the present invention, the liquid crystal display device having these diffusion means may be produced easily and in stability, thus enabling the angle of view of the liquid crystal display device to be improved significantly.

We claim:

1. A liquid crystal display device comprising:
   a first substrate having a first transparent electrode layer formed on an inner surface thereof;
   a second substrate having a second transparent electrode layer formed on an inner surface thereof;
   a liquid crystal layer sandwiched between the first and second substrates;
   a light source emitting a light;
   a collimator for collimating the light of said light source and providing the collimated light to the liquid crystal layer; and
   diffusion means for diffusing light transmitted through the liquid crystal layer, said diffusion means comprising a plurality of lenses arranged between the first substrate and the first transparent layer, and said lenses comprising spherical particles dispersed a transparent body.

2. A display device as claimed in claim 1, wherein said lenses are uniformly arranged along the first transparent electrode layer.

3. A display device as claimed in claim 1, wherein said collimator collimates the light within ±15° relative to a direction normal to the second substrates.

4. A display device as claimed in claim 1, wherein said collimator comprises a prism.

5. A display device as claimed in claim 1, wherein said diffusion means diffuses the transmitted light within ±40° relative to a direction normal to the first and second substrates.

6. A display device as claimed in claim 1, further comprising a color filter disposed between the diffusion means and the first transparent electrode layer.

7. A display device as claimed in claim 1, wherein said second transparent electrode layer is divided to form a plurality of pixel electrodes in a matrix.

8. The liquid crystal display device as set forth in claim 1, wherein said collimator is positioned between the light source and the second substrate.

9. The liquid crystal display device as set forth in claim 1, wherein each of the [plurality of] spherical particles has a diameter of approximately 1 micron.

10. The liquid crystal display device as set forth in claim 1, wherein each of the spherical particles has a diameter greater than 10 microns.

11. The liquid crystal display device as set forth in claim 1, wherein each of the spherical particles has a refractive index of approximately 1.9.

12. The liquid crystal display device as set forth in claim 1, wherein the diffusion means are positioned between the first substrate and the first transparent electrode layer.

13. The liquid crystal display device as set forth in claim 1, wherein said liquid crystal display device comprises a plurality of pixels, where each pixel is associated with one of said spherical particles.

14. A method for making a liquid crystal display device, the method comprising the steps of:
   arranging a plurality of spherical lenses on a first transparent substrate so that each pixel of the liquid crystal display device is associated with at least one spherical lens;

forming a first transparent electrode layer on the first transparent substrate so as to enclose the plurality of lenses between the first transparent electrode layer and the first transparent substrate;

forming a first alignment layer on said first transparent electrode layer;

forming a second transparent electrode layer on a second transparent substrate and forming a second alignment layer on the second transparent electrode layer;

combining the first and second transparent substrates so as to oppose the first and second alignment layers;

placing a liquid crystal between the first and second alignment layers; and providing a light source for irradiating the liquid crystal layer via the second transparent substrate.

15. A method as claimed in claim 14, wherein said step of arranging the plurality of spherical lenses comprises a step of uniformly arranging the plurality of spherical lenses along the first transparent electrode layer.

16. A method as claimed in claim 14, wherein said step of forming the second transparent electrode layer comprises a step of arranging a plurality of picture element electrodes in a matrix.

17. A method as claimed in claim 14, further comprising disposing a color filter layer on said first transparent substrate between the first transparent electrode layer and the spherical lenses.

18. The liquid crystal display device as set forth in claim 8, wherein the step of arranging the plurality of spherical lenses comprises a step of aligning a plurality of spherical lenses within each pixel of the liquid crystal display device.

* * * * *